United States Patent [19]

Brazel

[11] Patent Number: 4,468,043
[45] Date of Patent: Aug. 28, 1984

[54] HIGH TEMPERATURE SEAL

[76] Inventor: Patrick J. Brazel, 17216 Goya Ave., Granada Hills, Calif. 91344

[21] Appl. No.: 387,378

[22] Filed: Jun. 11, 1982

[51] Int. Cl.³ .............................................. F16J 15/22
[52] U.S. Cl. ................................................. 277/235 B
[58] Field of Search ..................... 277/203, 230, 235 B, 277/227, 233

[56] References Cited

U.S. PATENT DOCUMENTS

| | | | |
|---|---|---|---|
| 3,361,432 | 1/1968 | Usher | 277/235 |
| 3,481,824 | 12/1969 | Poltorak | 277/235 |
| 3,542,375 | 11/1970 | Renwick | 277/235 |
| 3,781,021 | 12/1973 | Thomson | 277/235 |
| 4,119,323 | 10/1978 | Meister | 277/235 R |

Primary Examiner—Robert I. Smith
Attorney, Agent, or Firm—Fraser and Boqucki

[57] ABSTRACT

A repeatedly but easily compressible seal structure providing high resistance to the passage of fire across a long seal path between two opposing members is provided by an assembly including a long spring member that is laterally compressible, an outer circular cover of an ablative material and an inner core of high temperature resistant material. The spring is fitted within the cover and tends to restore it to circular cross section after compression between the opposing members is released, so that the cover provides a seal for normal operation. The inner core at least substantially fills the space within the compressed spring. Thus, in the event of fire, the cover acts as an initial ablative barrier but after it decomposes on the exposed side the spring holds the core in position to maintain the thermal and fire barrier for a desired interval.

11 Claims, 4 Drawing Figures

HIGH TEMPERATURE SEAL

BACKGROUND OF THE INVENTION

In many aircraft structures and assemblies, such as engine nacelles, jet thrust reverser cowlings, auxiliary power units and other applications and locations, a fire barrier seal is utilized between opposing faces or parts. These opposing parts may be opened and closed repeatedly during aircraft operation or maintenance procedures. Typically, the seal must follow a long, usually enclosed and typically non-linear path around the structure, and provide a thermal barrier that will withstand particular conditions, such as an exposure to 2000° F. for in excess of 15 minutes. This standard test condition is imposed in order to assure protection for the occupants of the aircraft or for critical machinery against fires of less than catastrophic nature, and to provide adequate thermal protection for control or escape measures.

Prior barrier seals heretofore used in these applications have typically employed an extruded body of high temperature resin, such as hollow fluorosilicone cylinder having an integral flange or base on one side, and covered by a temperature resistant material such as fiberglass fabric or batt material. Prior constructions have been deficient in one of a number of respects, such as being too costly, requiring periodic replacement or providing an inadequate seal. It is difficult to uniformly wrap or adhere external insulation material to the internal tube, and so the external surface is not often smooth enough to make a seal. In addition, the seals, typically known as "bulb seals", are repeatedly compressed in normal use, and do not restore to their proper shape and maintain the seal. Furthermore, such seal structures often have marginal thermal resistance and burn out in an excessively short time. The capability of being compressed many thousands of times while still providing a good thermal barrier to fire is thus difficult to achieve. More rigid seals are not acceptable, because most parts using such seals have to be manipulated manually and excessive force would have to be applied.

SUMMARY OF THE INVENTION

Seal structures in accordance with the invention utilize a laterally compressible elongated metal spring disposed along the seal path. The spring encompasses an interior temperature resistant core but is also surrounded by and acts to expand an outer extruded cover of an ablative material. When installed between facing surfaces in an aircraft or other structure, this seal assembly is confined between the facing members, slightly flattened. Changes in compression resulting from opening and closing the facing surfaces are reacted against by the resistant force of the spring, the lateral compliance of which can be selected for a given application. The outer cover, which is of a plastic such as "Teflon" that decomposes to a gas at high temperature, is affirmatively restored to its position by the interior spring. In the event of fire, the cover acts as a first thermal barrier that absorbs a substantial amount of thermal energy in the course of ablating from the solid to the gaseous state. Thereafter, the seal is maintained principally by the interior high temperature core, which is held in position by the spring despite decomposition of the exposed face of the cover. The core is of high temperature ceramic fiber materials that provide the desired heat and flame barrier for an adequately long interval. The structure is arranged such that when the spring is compressed the core substantially fills the intervening space but is not significantly compacted. Thus repeated compressions of the unit do not deteriorate the barrier and the seal remains uniform and intact until fire is encountered.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
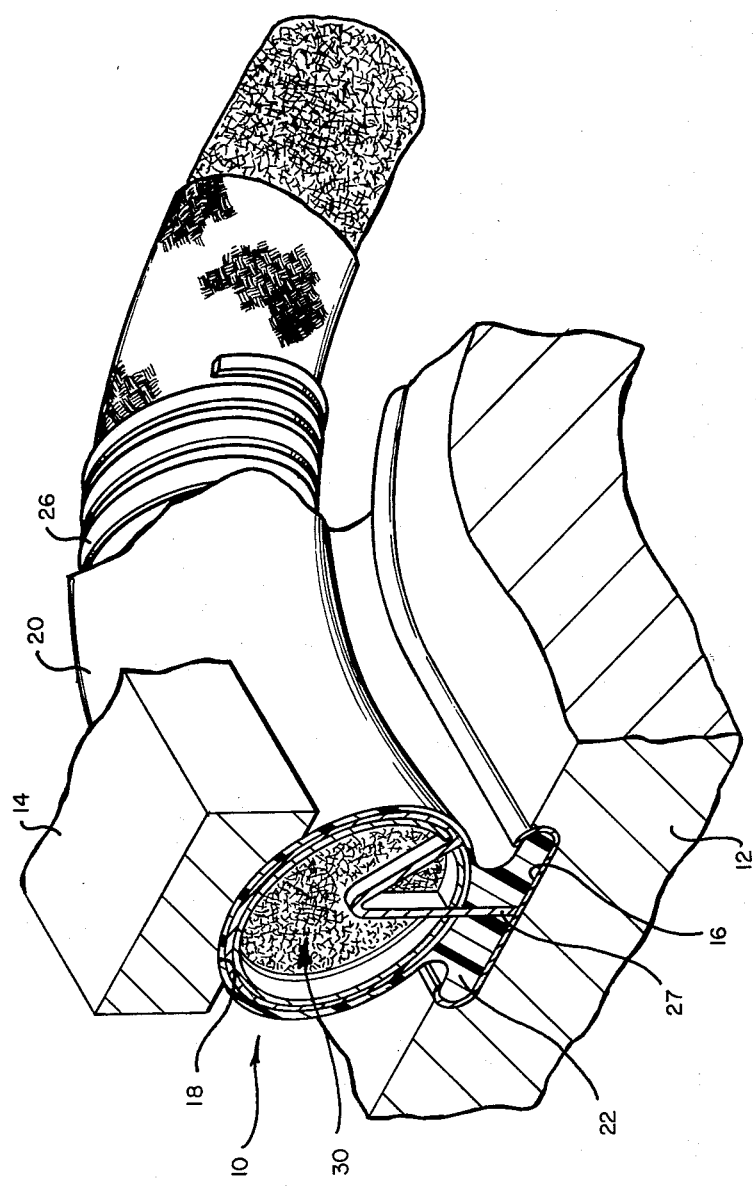
FIG. 1 is a perspective view, partially broken away, of a seal in accordance with the invention.

In accordance with the invention, a bulb seal structure 10 is imposed between a fire wall 12 which may be assumed for purposes of this example to be the forward part of an aircraft body, and an opposing member 14 which in this instance is a portion of an engine nacelle facing and spaced apart from the fire wall 12. The fire wall 12 includes a recessed channel 16 for receiving the base of the bulb seal 10, while the nacelle member 14 incorporates a concave groove 18 opposite to and paralleling the channel 16. The bulb seal 10 is seated within and positioned relative to the facing channel 16 and groove 18.

Figure 3:
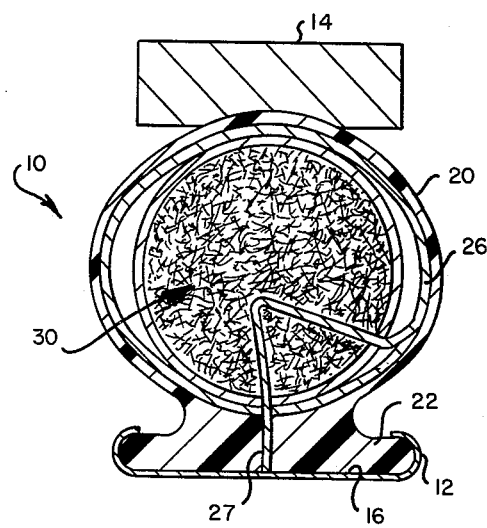
FIG. 3 is a cross-sectional view corresponding to FIG. 2 but showing the seal in an uncompressed state.

The bulb seal 10 itself comprises an outer extruded cover 20 of polytetrafluoroethylene (e.g. "Teflon") of generally circular cross section, as seen in FIG. 3, representing the free or uncompressed state. At one side of the circular cross section, however, the cover 20 has a split base 22, the outer configuration of which defines a seat that fits within and mates with the channel 16 to provide firm mechanical seating and support. Although such channels are widely used for mounting bulb seals, they are not required for seal structures in accordance with the invention because a wide range of other expedients for mounting or positioning the seal structure can be used.

Within the cover 20 is disposed a helical crescent spring 26 of stainless steel or a like temperature resistant material. The spring is adequately large in cross section to fill the inner diameter of the cover 20, and to be laterally compressed approximately 20% at the normal displacement of the seal member 14 from the fire wall 12. In addition this type of spring can be curved to follow a complex seal path without high resistance or a strong tendency to straighten out despite the length or curvatures utilized in the seal path. A pair of terminal end pieces 27 extending from the helical spring are fitted between the halves of the split base 22 of the cover 20, to maintain the relative longitudinal position of the elements and restrain the spring 26 against rotation.

Within the spring 26 and along the seal path is disposed a high temperature core 30 which substantially completely fills the compressed interior diameter of the spring 26. In a preferred example, the core 30 comprises a braided outer tube of high temperature ceramic fiber material, such as silica fibers, and an interior packing of high temperature glass fibers such as silicon glass. Alternatively, other widely available high temperature materials such as zirconia, alumina, aluminum silicate, aluminum oxide and high temperature glass fibers may be employed. The resultant core 30 structure is adequately resilient to yield slightly and restore itself to shape when the opposed faces 12, 14 are brought together to compress the seal. The core 30, however, is protected by the encompassing spring 26 against crushing and being moved out of position.

Figure 2:
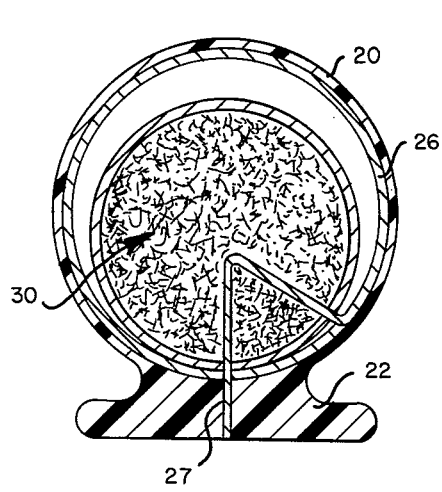
FIG. 2 is a cross-sectional view of the arrangement of FIG. 1 as mounted between a pair of opposing members.
Figure 4:
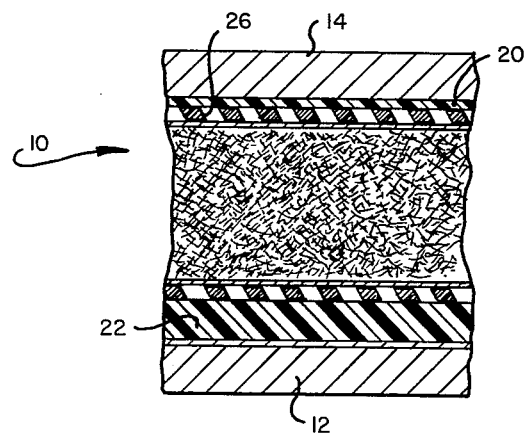
FIG. 4 is a side sectional view of a portion of the seal of FIG. 1.

In the operation of the seal 10, therefore, the elongated element in its free state of FIG. 3 is fitted between the opposing structures 12 and 14, being seated within the channel 16 and with its opposite surface engaging the groove 18. In normal position, as shown in FIGS. 2 and 4, the seal is compressed approximately 20%, and exerts a reactive force of only 2½ lbs. per inch. The resiliently expanded and compressed cover 20 provides a seal for normal ambient conditions, and not only conforms to both the opposed channel 16 and groove 18 to provide a full seal but is repeatedly compressible. The spring 26 maintains the high temperature interior core 30 in position, preferably but not necessarily contacting the core 30 firmly when compressed.

In the event of fire, initial fire resistance is provided by the "Teflon" cover 20, as the cover absorbs heat in going from the solid to the gaseous state in the ablation process. Decomposition at the surface not only absorbs heat but gives off gases which reduce the heat transfer into the structure. Because "Teflon" also conducts heat slowly, the significance of this thermal barrier under fire conditions is meaningful, and can be accentuated if desired by increasing the thickness of the cover.

The cover 20 gradually decomposes on the side facing the flame until the products of combustion reach the crescent spring 26. At this stage in the exposure to fire the spring 26 acts as an intermediate fire barrier, the effectiveness of which is dependent on the spacing between adjacent turns of the spring 26. For some applications it may be desired to space the turns so closely that a virtually continuous stainless steel wall is interposed in the path of the flame. The major thermal barrier is however the high temperature core 30 which at least substantially fills the interior space between the opposing surfaces 12, 14. High temperature refractory fibers of the type mentioned have melting points in excess of 2200° F. and extremely high heats of fusion so they can withstand 2000° F. for many hours. Longer exposure times can be assured at higher cost by using fibers having even greater temperature resistance. Because the stainless steel spring 26 is unaffected at these temperatures, the barrier remains essentially complete, with the core 30 being held in position by the spring. The position is maintained even though the more massive base of the cover is gradually eroded away during decomposition on the hot side, because the spring 26 expands simply into any voids to remain locked between the channel and groove.

Seal structures in accordance with the invention therefore provide a multiple closure that may nonetheless be readily compressed to permit easy manual locking of a panel or member in an aircraft or other structure. The outer cover, which is urged radially outwardly relative to its longitudinal axis by the interior spring, provides an effective seal for all normal operation and is not affected by repeated compressions. This cover may be of TFE material, as mentioned, but may also be of FEP (fluorinated ethylene propylene) or another type of fluorocarbon or other resin having adequate temperature resistance, ablative characteristics and fabrication properties. Although a crescent spring has been described, it will be appreciated that a different spring type (e.g. a canted helical spring) may also be used to provide the desired lateral compressibility, and capability for being configured in a desired seal path.

Alternatively also, the base may be made of a separate, refractory fiber filled material, or may include longitudinal members filled with high temperature materials similar to the core 30. Further, the spring 26 and high temperature core 30 may be of different cross-sectional shapes than round. For example, the spring 26 may be oval, so that it compresses to a more round shape and acts to pinch the sides of the core when the cover material decomposes.

While a number of different modifications and expedients in accordance with the invention have been suggested it will be appreciated that the invention is not limited thereto but encompasses all forms and variations within the scope of the appended claims.

What is claimed is:

1. A bulb seal system for incorporation as a fire barrier between opposed members in an aircraft or similar structure comprising:
   an outer cover member of generally circular cross section including a split base of greater thickness for attachment to one of the opposed members;
   an interior helical stainless steel spring within the outer cover member and extending therealong, the interior spring being of a temperature resistant metal and having an open interior; and
   a temperature resistant core member comprising a structure of refractory fibers within the spring member and extending therealong, the cover and spring being sufficiently over-sized to be partially compressed when positioned in the seal position and the interior temperature resistant core substantially filling the interior of the compressed spring, such that the system conforms to the desired fire barrier configuration during compression and expansion and presents the cover member, the spring and the uncompressed core member as successive barriers to fire.

2. The invention as set forth in claim 1 above, wherein the temperature resistant core comprises an outer woven member of refractory fibers and a filling of refractory fibers therewithin.

3. The invention as set forth in claim 2 above, wherein the outer cover comprises a polytetrafluoroethylene extrusion.

4. A compressible seal construction for usage as a fire and thermal barrier along an elongated seal path, which may be nonlinear between a pair of members typically separated by a predetermined distance but separable under normal operation, such that the seal is intermittently cycled through compressed and unloaded states, comprising:
   a circular outer cover of a synthetic resin material extending along the seal path between the members;
   an elongated, laterally compressible spring member disposed within the cover along the length thereof, the spring member comprising a helical spring readily distortable along the seal path without introducing a spring force that tends to strengthen the spring member, and having an outer diameter engaging the inner diameter of the cover, the cover and spring being sufficiently oversize relative to the predetermined distance to be slightly compressed when in position along the seal path; and an interior high temperature core member disposed within the spring, the core member at least substantially filling the space within the compressed spring when the seal is in position and comprising a tubular shape including high temperature refractory fibers.

5. The invention as set forth in claim 4 above, wherein the core member comprises a woven outer member and a fibrous filler.

6. The invention as set forth in claim 5 above, wherein the woven outer member is of silica fibers and the fibrous filler is high temperature glass.

7. The invention as set forth in claim 4 above, wherein the spring member comprises a stainless steel crescent spring.

8. The invention as set forth in claim 4 above, wherein the cover and spring member are compressed approximately 20% when the pair of members are separated by the predetermined distance.

9. The invention as set forth in claim 8 above, wherein the spring member exerts a force of approximately 2.5 pounds per linear inch when under compression.

10. The invention as set forth in claim 9 above, wherein one of the pair of members includes a seating channel disposed along the seal path and the cover includes a base seated in and mating with the seating channel.

11. The invention as set forth in claim 10 above, wherein the cover is an extruded "Teflon" member.

* * * * *